United States Patent
Lashmore et al.

(10) Patent No.: US 10,543,509 B2
(45) Date of Patent: Jan. 28, 2020

(54) NANOTUBE MATERIAL HAVING CONDUCTIVE DEPOSITS TO INCREASE CONDUCTIVITY

(71) Applicant: Nanocomp Technologies, Inc., Merrimack, NH (US)

(72) Inventors: David S. Lashmore, Lebanon, NH (US); Paul Jarosz, Merrimack, NH (US); Joseph E. Johnson, Nashua, NH (US)

(73) Assignee: Nanocomp Technologies, Inc., The Woodlands, TX (US)

( * ) Notice: Subject to any disclaimer, the term of this patent is extended or adjusted under 35 U.S.C. 154(b) by 110 days.

(21) Appl. No.: 13/859,607

(22) Filed: Apr. 9, 2013

(65) Prior Publication Data

US 2013/0264116 A1    Oct. 10, 2013

Related U.S. Application Data

(60) Provisional application No. 61/621,847, filed on Apr. 9, 2012.

(51) Int. Cl.
| | |
|---|---|
| *B05D 5/12* | (2006.01) |
| *H01B 1/04* | (2006.01) |
| *H01B 1/02* | (2006.01) |
| *B82Y 40/00* | (2011.01) |
| *B82Y 30/00* | (2011.01) |

(52) U.S. Cl.
CPC ............... *B05D 5/12* (2013.01); *H01B 1/02* (2013.01); *H01B 1/04* (2013.01); *B82Y 30/00* (2013.01); *B82Y 40/00* (2013.01)

(58) Field of Classification Search
None
See application file for complete search history.

(56) References Cited

U.S. PATENT DOCUMENTS

| | | |
|---|---|---|
| 3,462,289 A | 8/1969 | Rohl et al. |
| 4,583,247 A | 4/1986 | Fingerhut et al. |
| 5,648,027 A | 7/1997 | Tajiri et al. |
| 5,874,159 A | 2/1999 | Cruise et al. |
| 6,333,016 B1 | 12/2001 | Resasco et al. |

(Continued)

FOREIGN PATENT DOCUMENTS

| | | |
|---|---|---|
| DE | 10 2006 014171 | 9/2007 |
| JP | 2004-315297 | 11/2004 |

(Continued)

OTHER PUBLICATIONS

Ko et al., "Electrospinning of Continuous Carbon Nanotube-Filled Nanofiber Yarns," Advanced Materials. 15(14): 1161-1165 (2003).

(Continued)

*Primary Examiner* — Jenna L Johnson
(74) *Attorney, Agent, or Firm* — Nanocomp Technologies, Inc.; Lewis Craft (57) ABSTRACT

An apparatus having a conductive body defined by a plurality of nanotubes forming a planar structure. The apparatus further includes a plurality of junctions, formed by adjacent nanotubes, and a plurality of conductive deposits positioned at the junctions to electrically join the adjacent nanotubes at the junctions and reduce electrical resistance between the nanotubes, thereby increasing overall conductivity of the body.

9 Claims, 6 Drawing Sheets

(56) References Cited

U.S. PATENT DOCUMENTS

| | | | |
|---|---|---|---|
| 6,426,134 | B1 | 7/2002 | Lavin et al. |
| 6,706,402 | B2 | 3/2004 | Rueckes et al. |
| 7,244,374 | B2 | 7/2007 | Anazawa et al. |
| 7,288,317 | B2 | 10/2007 | Poulin et al. |
| 7,354,877 | B2 | 4/2008 | Rosenberger et al. |
| 7,670,970 | B2 | 3/2010 | Ko |
| 8,053,113 | B2 | 11/2011 | Oh et al. |
| 8,080,335 | B2 | 12/2011 | Kawakami et al. |
| 8,119,095 | B2 | 2/2012 | Ahn et al. |
| 8,926,933 | B2 | 1/2015 | Zhang et al. |
| 9,028,790 | B2 | 5/2015 | Sato et al. |
| 2003/0104156 | A1 | 6/2003 | Osada et al. |
| 2003/0108477 | A1 | 6/2003 | Keller et al. |
| 2003/0122111 | A1* | 7/2003 | Glatkowski ................. 252/500 |
| 2003/0143453 | A1 | 7/2003 | Ren et al. |
| 2003/0198812 | A1 | 10/2003 | Rueckes et al. |
| 2004/0041154 | A1 | 3/2004 | Watanabe et al. |
| 2004/0177451 | A1 | 9/2004 | Poulin et al. |
| 2005/0079119 | A1 | 4/2005 | Kawakami et al. |
| 2005/0087726 | A1 | 4/2005 | Anazawa et al. |
| 2005/0095938 | A1 | 5/2005 | Rosenberger et al. |
| 2005/0124246 | A1 | 6/2005 | Ko |
| 2005/0209392 | A1* | 9/2005 | Luo ................. B82Y 30/00 524/496 |
| 2005/0220988 | A1* | 10/2005 | Dodelet ............... H01M 4/885 427/113 |
| 2007/0036709 | A1 | 2/2007 | Lashmore et al. |
| 2007/0104993 | A1 | 5/2007 | Lee et al. |
| 2007/0116627 | A1 | 5/2007 | Collier et al. |
| 2007/0202403 | A1 | 8/2007 | Oh et al. |
| 2008/0166563 | A1 | 7/2008 | Brittingham et al. |
| 2008/0170982 | A1 | 7/2008 | Zhang et al. |
| 2008/0296683 | A1 | 12/2008 | Yoon et al. |
| 2009/0044848 | A1 | 2/2009 | Lashmore et al. |
| 2009/0068241 | A1 | 3/2009 | Britz et al. |
| 2009/0117268 | A1* | 5/2009 | Lewis ................... B05D 1/60 427/205 |
| 2009/0145750 | A1 | 6/2009 | Botte |
| 2009/0196981 | A1 | 8/2009 | Liu et al. |
| 2009/0277897 | A1* | 11/2009 | Lashmore .............. H01B 1/04 219/544 |
| 2009/0305135 | A1 | 12/2009 | Shi et al. |
| 2009/0317710 | A1 | 12/2009 | Douglas et al. |
| 2009/0320911 | A1* | 12/2009 | Ruoff ................... B82Y 10/00 136/252 |
| 2010/0021682 | A1 | 1/2010 | Liang et al. |
| 2010/0028639 | A1* | 2/2010 | Liang et al. ................. 428/220 |
| 2010/0044074 | A1* | 2/2010 | Kim et al. ................ 174/126.2 |
| 2010/0216030 | A1 | 8/2010 | Maeda |
| 2010/0252184 | A1 | 10/2010 | Morimoto et al. |
| 2010/0261821 | A1 | 10/2010 | Park et al. |
| 2011/0027162 | A1 | 2/2011 | Steiner, III et al. |
| 2011/0051775 | A1 | 3/2011 | Ivanov et al. |
| 2011/0111279 | A1 | 5/2011 | Smithyman et al. |
| 2011/0127472 | A1 | 6/2011 | Sato et al. |
| 2011/0224113 | A1 | 9/2011 | Pick et al. |
| 2012/0015098 | A1 | 1/2012 | Cheng et al. |
| 2012/0183770 | A1 | 7/2012 | Bosnyak et al. |

FOREIGN PATENT DOCUMENTS

| | | |
|---|---|---|
| JP | 2004-339499 | 12/2004 |
| JP | 2005-502792 | 1/2005 |
| JP | 2005-075672 | 3/2005 |
| JP | 2008-281672 | 10/2005 |
| JP | 2007-063552 | 3/2007 |
| JP | 2007-182352 | 7/2007 |
| JP | 2008-108583 | 5/2008 |
| JP | 2008-523254 | 7/2008 |
| JP | 2009242145 | 10/2009 |
| JP | 2009252713 | 10/2009 |
| JP | 2012-533158 | 12/2012 |
| WO | WO 03/004741 | 1/2003 |
| WO | WO 03/080905 | 10/2003 |
| WO | 2005069412 | 7/2005 |
| WO | 2006/137893 | 12/2006 |
| WO | WO 2007/015710 | 2/2007 |
| WO | 2007086878 | 8/2007 |
| WO | 2007089118 | 8/2007 |
| WO | 2008/001998 | 1/2008 |
| WO | 2008/002071 | 1/2008 |
| WO | 2009064133 | 5/2009 |
| WO | WO 2009/072478 | 6/2009 |
| WO | WO 2010/036405 | 4/2010 |
| WO | WO 2010/151244 | 12/2010 |
| WO | 2011/005964 | 1/2011 |
| WO | 2011/091257 | 7/2011 |
| WO | 2011/163129 | 12/2011 |

OTHER PUBLICATIONS

Ng, "Single walled carbon nanotube paper as anode for lithium ion battery," Elechtrochimica Acta 51. 23-28 (2005).

Wang, "Processing and property investigation of single walled carbon nanotube (SWNT) buckypaper/epoxy resin matrix nanocomposites," Composites. 35(10): 1225-1232 (2004).

Xiao et al., "High-Mobility Thin-Film Transistors Based on Aligned Carbon Nanotubes," Applied Physics Letters, 83(1): 150-152 (2003).

Australian Office Action issued in Australian Application No. 2012205268 mailed on Aug. 20, 2013.

European Search Report issued in European Application No. 12157811.6 mailed on Sep. 12, 2013.

International Search Report issued in International Application No. PCT/US13/22873 mailed on Sep. 27, 2013.

Japanese Office Action issued in Japanese Application No. 2010-518417 mailed on Sep. 10, 2013.

Japanese Office Action issued in Japanese Application No. 2011-508688 mailed on Nov. 19, 2013.

Japanese Office Action issued in Japanese Application No. 2011-508689 mailed on Nov. 19, 2013.

Japanese Office Action issued in Japanese Application No. 2012-519729 mailed on Nov. 26, 2013.

U.S. Office Action issued in U.S. Appl. No. 12/566,229 mailed on Jul. 23, 2013.

U.S. Office Action issued in U.S. Appl. No. 12/390,906 mailed on Sep. 30, 2013.

U.S. Office Action issued in U.S. Appl. No. 12/437,538 mailed on Nov. 26, 2013.

U.S. Office Action issued in U.S. Appl. No. 12/191,765 mailed on Dec. 3, 2013.

U.S. Office Action issued in U.S. Appl. No. 13/294,698 mailed on Jan. 2, 2014.

International Search Report in International Application No. PCT/US2013/035844 mailed Jul. 12, 2013.

Malik, Sharali et al.; "Failure mechanism of free standing single-walled carbon nanotube thin films under tensile load"; Phyical Chemistry Chemical Physics; 2004,6, 3540-3544.

Vigolo et al., "Improved Structure and Properties of since-wall carbon nanotube spun fibers", Applied Physics Letters, American Institute of Physics, US, vol. 81, No. 7, Aug. 12, 2002, pp. 1210-1212, XP012033229.

Extended European Search Report issued in European Application No. 13774950.3 mailed Nov. 6, 2015.

Gou, J.G., "Passage: Nanotube Bucky Papers and Nanocomposites", Ph.D. Dissertation, Marburg An Der Lahn, pp. 93-126, Jan. 1, 2002.

Scheffler, M. et al., "Nickel catalyzed in situ formation of carbon nanotubes and turbostatic carbon in polymer-derived ceramics,", Material chemistry and Physics, vol. 84, No. 1, pp. 131-139, Mar. 1, 2004.

Hulicova, D. et al., "An Attempt to prepare carbon nanotubes by the spinning of microcapsules", Carbon, vol. 39, No. 9, pp. 1438-1442, Aug. 1, 2001.

Extended European Search Report issued in European Application No. 14812969.5 dated Jan. 2, 2017.

Yu et al: "controlling the dispersion of multi-wall carbon nanotubes in aqueous surfactant solution", Carbon, Elsevier, Oxford, GF, vol. 45, No. 3 Jan. 26, 2007 (Jan. 26, 2007), pp. 618-623.

(56) References Cited

OTHER PUBLICATIONS

Li and Marzari, "Improving the Electrical Conductivity of Carbon Nanotube Networks: A First Principles Study", ACS Nano, 2011, 5(12), pp. 9726-9736.
Nimalraj et al., "Electrical Connectivity in Single-Walled Carbon Nanotube Networks", Nano Letters, 2009, 9(11), pp. 3890-3895.
Zhou, "Microjoining and Nanojoining", CRC Press, 2008.

* cited by examiner

NANOTUBE MATERIAL HAVING CONDUCTIVE DEPOSITS TO INCREASE CONDUCTIVITY

CROSS-REFERENCE TO RELATED APPLICATIONS

This application claims priority to and benefit of Provisional Patent Application Ser. No. 61/621,847, filed on Apr. 9, 2012, the content of which is incorporated herein by reference in its entirety.

TECHNICAL FIELD

The present invention relates to nanotube based material, and more particularly, to material made from carbon nanotubes (CNT) having conductive deposits at junctions where adjacent nanotubes intersect.

BACKGROUND

Within the last 15 years, as the properties of carbon nanotubes have been better understood, interests in carbon nanotubes have greatly increased within and outside of the research community. One key to making use of these properties is the synthesis of nanotubes in sufficient quantities for them to be used industrially. For example, large quantities of carbon nanotubes may be needed if they are to be used as high strength components of CNTs in macroscale three-dimensional structures (i.e., structures having dimensions greater than about 1 cm).

Carbon nanotubes are known to have extraordinary tensile strength, including high strain to failure and relatively high tensile modulus. At a molecular level, carbon nanotubes may also be highly electrically and thermally conductive while being resistant to fatigue, radiation damage, and heat. For example, carbon nanotubes can be good thermal and electrical conductors along the tube, where each individual tube can have thermal conductivities potentially in excess of 2000 W/m·K. However, this conductivity is anisotropic, exhibiting properties with different values when measured in different directions and is dramatically reduced when a large ensemble of tubes are used in a sheet or mat.

A carbon nanotube material, having decreased electrical resistance between adjacent carbon nanotubes so as to increase overall conductivity of the material, would be desirable.

SUMMARY OF THE INVENTION

According to an embodiment of the present invention, there is provided a conductive material having a conductive body defined by a plurality of nanotubes forming a planar structure. The apparatus further includes a plurality of junctions, formed by adjacent nanotubes, and a plurality of conductive deposits positioned at the junctions to electrically join the adjacent nanotubes at the junctions and reduce electrical resistance between the nanotubes, thereby increasing overall conductivity of the body.

According to another embodiment of the present invention, there is provided a method having a step of providing a material defined by a plurality of carbon nanotubes deposited on top of one another. The method further includes steps of treating the material with a substance that can infiltrate spaces between individual nanotubes, and reducing the substance, to allow the reduced substance to form conductive deposits at junctions between the individual nanotubes, so as to reduce electrical resistance between the individual nanotubes at the junctions.

According to another embodiment of the present invention, there is provided a method of enhancing electrical conduction in carbon nanotube material having a step of forming a planar conductor from a cloud of individual carbon nanotubes. The method further includes steps of depositing in the conductor a substance that can infiltrate spaces between individual nanotubes, reducing the substance, to allow the reduced substance to form conductive deposits at junctions between the nanotubes, so as to reduce electrical resistance between the individual nanotubes at the junctions, and conducting electrical energy along the conductor by allowing the conductive deposits to transmit electrical energy across junctions between individual nanotubes.

DETAILED DESCRIPTION OF SPECIFIC EMBODIMENTS

The present invention provides, in one embodiment, a material made from nanotubes. In an embodiment, the material is a carbon nanotube (CNT) sheet, fiber, yarn, or other structure. In another embodiment, the material includes a plurality of carbon nanotubes yarns or fibers twisted or bundled together to form a larger fiber or yarn. The material possesses multifunctional properties that can promote thermal insulation, EMI, EMP, EDS shielding, and optical absorption, among other things. In an embodiment, each CNT sheet or yarn is defined by a plurality of carbon nanotubes configured so as to minimize normal-to-plane thermal conductivity through the CNT sheet or yarn. In such embodiment, the CNT sheet or yarn can be used as a thermal insulator in the normal-to-plane direction. In another embodiment, each CNT sheet or yarn is defined by a plurality of carbon nanotubes configured so as to allow electrical conductivity through the CNT material.

Presently, there exist multiple processes and variations thereof for growing nanotubes, and forming CNT sheets, yarns or cable structures. These include: (1) Chemical Vapor Deposition (CVD), a common process that can occur at near ambient or at high pressures, and at temperatures above about 400° C., (2) Arc Discharge, a high temperature process that can give rise to tubes having a high degree of perfection, (3) Laser ablation and forest growth on a substrate. Any of these methods can be used for the formation of CNTs that can be post processed into a non-woven sheet or textile (e.g., Bucky Paper or CNT sheets directly fabricated from the CVD reactor).

The present invention, in one embodiment, employs a CVD process or similar gas phase pyrolysis procedures to generate the appropriate sheet type materials made from carbon-based nanostructures, including carbon nanotubes. Carbon nanotubes, including single wall (SWNT), double wall (DWNT), and multiwall (MWNT), may be grown, in an embodiment of the present invention, by exposing nanoscaled catalyst particles in the presence of reagent carbon-containing gases (i.e., gaseous carbon source at elevated temperatures). In particular, the nanoscaled catalyst particles may be introduced into the reagent carbon-containing gases, either by addition of existing particles or by in situ synthesis of the particles from a metal-organic precursor, or even non-metallic catalysts. Although SWNT, DWNT, and MWNT may be grown, in certain instances, SWNT may be selected due to their relatively higher growth rate and tendency to form rope-like structures, which may offer advantages in handling, thermal conductivity, electronic properties, and strength. In other instances, DWNT or MWCNTs may be grown for thermal properties that are advantageous for thermal applications, such as insulators.

The strength of the nanotubes generated in connection with the present invention may be about 30 GPa or more. Strength, as should be noted, is generally sensitive to defects. However, the elastic modulus of the carbon nanotubes fabricated in accordance with an embodiment of the present invention may not be sensitive to defects and can vary from about 1 to about 1.2 TPa. Moreover, the strain to failure, which generally can be a structure sensitive parameter, may range from about 10% to about 25% for carbon nanotubes used in the present invention.

Furthermore, the nanotubes of the present invention can be provided with relatively small diameter. In an embodiment of the present invention, the nanotubes fabricated in the present invention can be provided with a diameter in a range of from less than 1 nm to about 10 nm.

In various embodiments, materials made from nanotubes of the present invention can represent a significant advance over copper and other metallic conducting members, as such materials are electrical conductors. In addition, CNT sheets made in accordance with an embodiment of the present invention can be a good insulator in a direction normal (e.g., transverse) to the plane of the CNT sheet, while being a good conductor in the plane of the CNT sheet. Additional anisotropy can be introduced within the plane by stretching the sheets (to substantially the CNTs within the sheet.).

Figure 1:
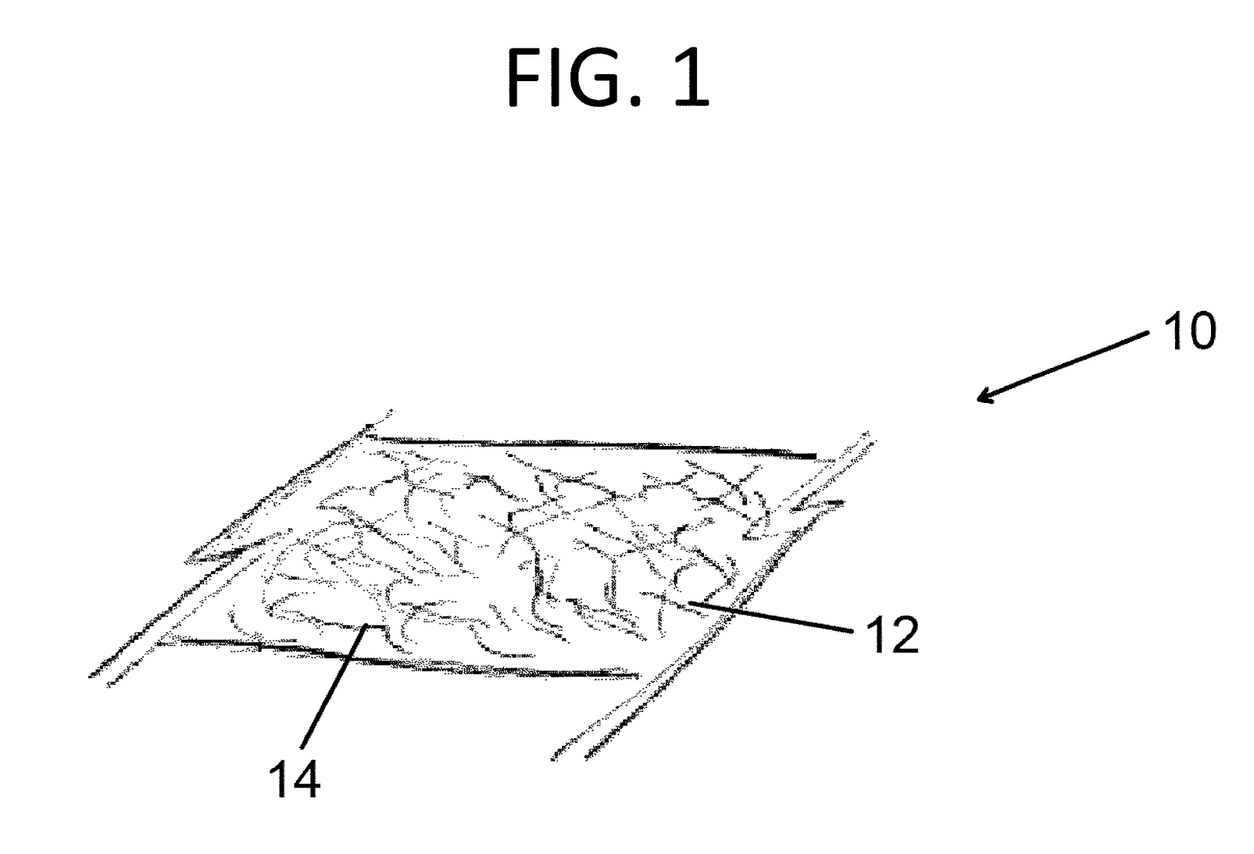
FIG. 1 illustrates a nanotube sheet in accordance with an embodiment of the present invention.
Figure 2:
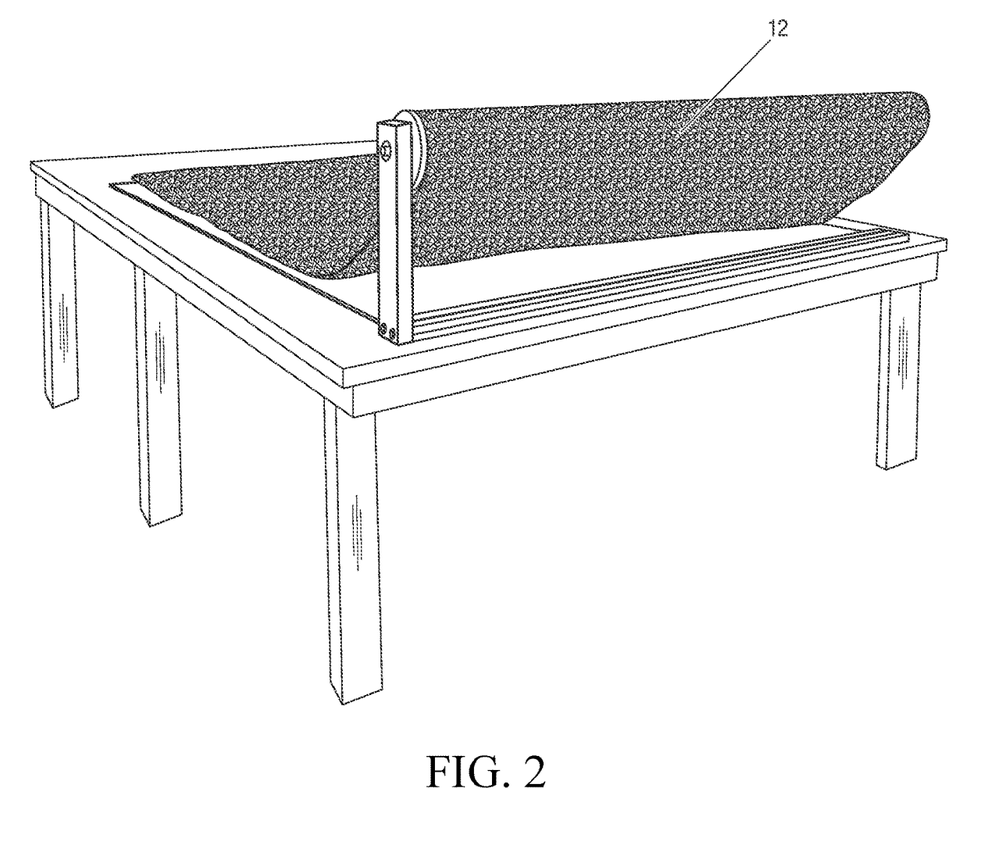
FIG. 2 illustrates a nanotube sheet in accordance with an embodiment of the present invention.

Looking now at FIGS. 1 and 2, the present invention provides, in an embodiment, a CNT strip 10 made from a nanostructured CNT sheet 12. The CNT strip 10 can be so designed to allow electrical conductivity along its length, i.e., within the plane of the CNT sheet 12. As shown in FIG. 1, the CNT strip 10 may include a substantially planar body in the form of a single CNT sheet 12. The sheet 12 may, in one embodiment, be a single layer of a plurality of non-woven carbon nanotubes 14 deposited on top of one another from a cloud of CNT, or alternatively be multiple layers 51, each layer being a plurality of non-woven nanotubes deposited on top of one another from a cloud of CNT (see FIG. 5). In case of a multiple-layer sheet, the plurality of non-woven carbon nanotubes forms a phyllo-dough structure whereby each layer includes a plurality of non-woven carbon nanotubes deposited on top of one another from a cloud of CNT. In other embodiments, the CNT strip 10 can be one or more CNT yarns. The strip can be a single yarn, or a plurality of yarns bundled or twisted together to form a larger yarn. Examples of CNT yarns are described in U.S. Pat. No. 7,993,620 (filed Jul. 17, 2006), which is incorporated herein by reference in its entirety.

In accordance with an embodiment of the present invention, some or all of the CNT sheets 12 used in the formation of CNT strip 10 may be processed (e.g., doped) to contain a dopant. A dopant can be any material that can cause phonon scattering, so as to decrease thermal transport. Suitable dopants include, for example, boron, carbon 13, irradiated CNT materials, or any combination thereof. Other post-production modification and/or layering methods may also be applied to modify a thermal conductivity of the CNT insulator. For example, the plurality of carbon nanotubes 14 can be physically and/or chemically configured to increase in-plane thermal conductivity and to decrease normal-to-plane thermal conductivity. In some embodiments, a conductive material can be deposited at the junctions between nanotubes to weld, or join, or otherwise conductively connect the nanotubes together and decrease electrical resistance between the nanotubes. In particular, conductive connections between individual carbon nanotubes can be formed with physical connections or bridges using deposited material, or can be formed with chemical bonds or intermolecular forces using deposited material, or can be formed with a combination thereof. In other embodiments, the nanotubes can be exfoliated or swelled before a conductive material is deposited, and the nanotubes can be mechanically or otherwise compressed after the conductive material is deposited to further enhance the conductive effects of the deposited material. Further in other embodiment, the nanotubes can be exposed to a co-solvent to reduce the surface tension of aqueous solvents used while the conductive material is deposited in and among the carbon nanotubes, in order to enhance the mass transport of the conductive material or chemical agents into the carbon nanotube material.

It should be noted that although reference is made throughout the application to nanotubes synthesized from carbon, other compound(s), such as boron, $MoS_2$, $WS_2$, $NS_2$ or a combination thereof may be used in the synthesis of nanotubes in connection with the present invention. For instance, it should be understood that boron nanotubes may also be grown, but with different chemical precursors. In addition, it should be noted that boron may also be used to reduce resistivity in individual carbon nanotubes at higher temperatures. Furthermore, other methods, such as plasma CVD or the like, can also be used to fabricate the nanotubes of the present invention.

System for Fabricating Sheets and Yarns

Figure 3:
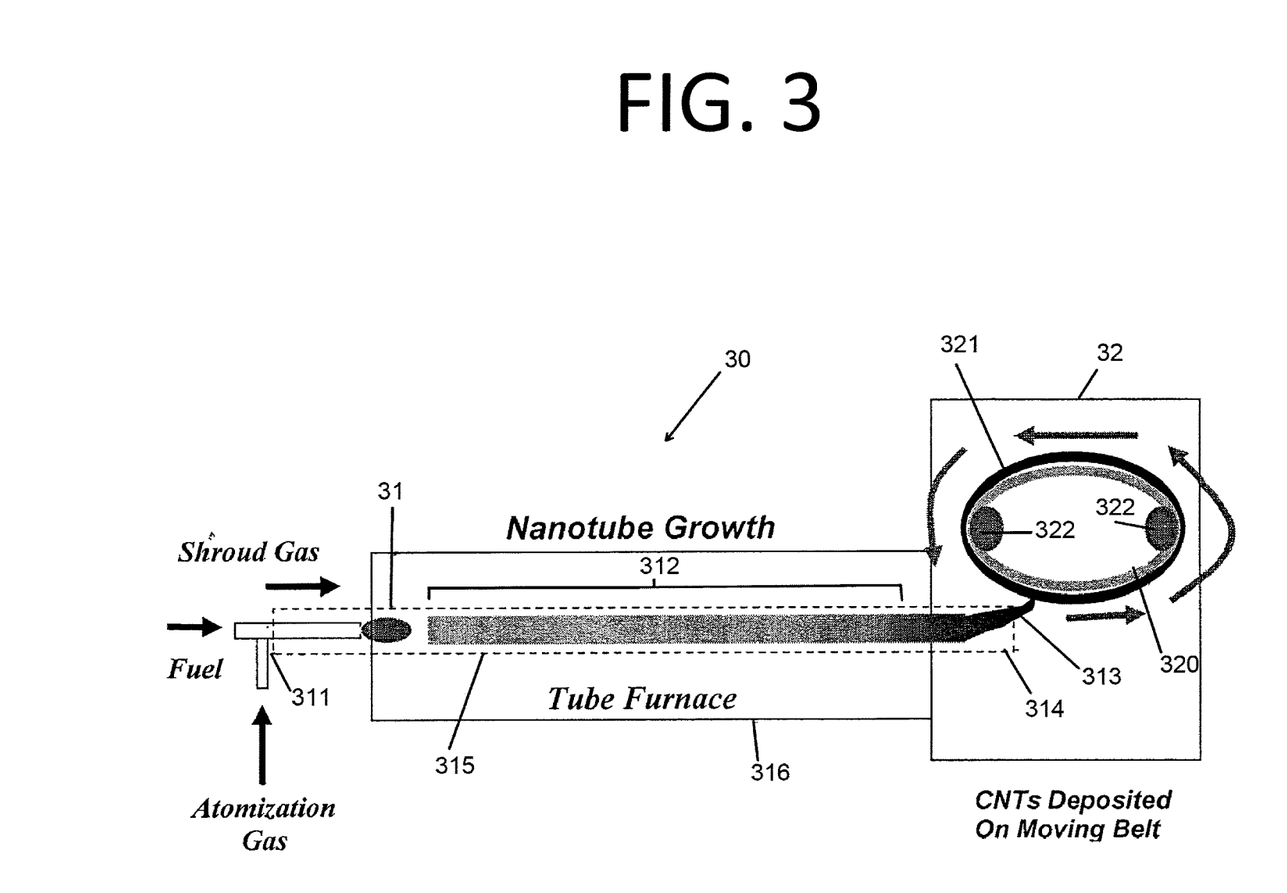
FIG. 3 illustrates a system for fabricating nanotubes and nanotube sheets, in accordance with one embodiment of the present invention.

With reference now to FIG. 3, there is illustrated a system 30, similar to that disclosed in U.S. Pat. No. 7,993,620 (filed Jul. 17, 2006; incorporated herein by reference), for use in the fabrication of nanotubes. System 30, in an embodiment, may include a synthesis chamber 31. The synthesis chamber 31, in general, includes an entrance end 311, into which reaction gases (i.e., gaseous carbon source) may be supplied, a hot zone 312, where synthesis of nanotubes 313 may occur, and an exit end 314 from which the products of the reaction, namely a cloud of nanotubes and exhaust gases, may exit and be collected. The synthesis chamber 31, in an embodiment, may include a quartz tube, a ceramic tube or a FeCrAl tube 315 extending through a furnace 316. The nanotubes generated by system 30, in one embodiment, may be individual single-walled nanotubes, bundles of such nanotubes, and/or intermingled or intertwined single-walled nanotubes, all of which may be referred to hereinafter as "non-woven."

System 30, in one embodiment of the present invention, may also include a housing 32 designed to be substantially fluid (e.g., gas, air, etc.) tight, so as to minimize the release of potentially hazardous airborne particulates from within the synthesis chamber 31 into the environment. The housing 32 may also act to prevent oxygen from entering into the system 30 and reaching the synthesis chamber 31. In particular, the presence of oxygen within the synthesis chamber 31 can affect the integrity and can compromise the production of the nanotubes 313.

System 30 may also include a moving belt 320, positioned within housing 32, designed for collecting synthesized nanotubes 313 generated from within synthesis chamber 31 of system 30. In particular, belt 320 may be used to permit nanotubes collected thereon to subsequently form a substantially continuous extensible structure 321, for instance, a CNT sheet. Such a CNT sheet may be generated from substantially non-aligned, non-woven nanotubes 313, with sufficient structural integrity to be handled as a sheet. Belt 320, in an embodiment, can be designed to translate back and forth in a direction substantially perpendicular to the flow of gas from the exit end 314, so as to increase the width of the CNT sheet 321 being collected on belt 320.

To collect the fabricated nanotubes 313, belt 320 may be positioned adjacent the exit end 314 of the synthesis chamber 31 to permit the nanotubes to be deposited on to belt 320. In one embodiment, belt 320 may be positioned substantially parallel to the flow of gas from the exit end 314, as illustrated in FIG. 3. Alternatively, belt 320 may be positioned substantially perpendicular to the flow of gas from the exit end 314 and may be porous in nature to allow the flow of gas carrying the nanomaterials to pass through the belt. In one embodiment, belt 320 can be designed to translate from side to side in a direction substantially perpendicular to the flow of gas from the exit end 314, so as to generate a sheet that is substantially wider than the exit end 314. Belt 320 may also be designed as a continuous loop, similar to a conventional conveyor belt, such that belt 320 can continuously rotate about an axis, whereby multiple substantially distinct layers of CNT can be deposited on belt 320 to form a sheet 321, such as that shown in FIG. 5. To that end, belt 320, in an embodiment, may be looped about opposing rotating elements 322 and may be driven by a mechanical device, such as an electric motor. In one embodiment, the mechanical device may be controlled through the use of a control system, such as a computer or microprocessor, so that tension and velocity can be optimized. The deposition of multiple layers of CNT in formation of sheet 321, in accordance with one embodiment of the present invention, can result in minimizing interlayer contacts between nanotubes. Specifically, nanotubes in each distinct layer of sheet 321 tend not to extend into an adjacent layer of sheet 321. As a result, normal-to-plane thermal conductivity can be minimized through sheet 321.

To disengage the CNT sheet 321 of intermingled non-woven nanomaterials from belt 320 for subsequent removal from housing 32, a blade (not shown) may be provided adjacent the roller with its edge against surface of belt 320. In this manner, as CNT sheet 321 is rotated on belt 320 past the roller, the blade may act to lift the CNT sheet 321 from surface of belt 320. In an alternate embodiment, a blade does not have to be in use to remove the CNT sheet 321. Rather, removal of the CNT sheet may be by hand or by other known methods in the art.

Additionally, a spool (not shown) may be provided downstream of blade, so that the disengaged CNT sheet 321 may subsequently be directed thereonto and wound about the spool for harvesting. As the CNT sheet 321 is wound about the spool, a plurality of layers of CNT sheet 321 may be formed. Of course, other mechanisms may be used, so long as the CNT sheet 321 can be collected for removal from the housing 32 thereafter. The spool, like belt 320, may be driven, in an embodiment, by a mechanical device, such as an electric motor, so that its axis of rotation may be substantially transverse to the direction of movement of the CNT sheet 321.

In order to minimize bonding of the CNT sheet 321 to itself as it is being wound about the spool; a separation material may be applied onto one side of the CNT sheet 321 prior to the sheet being wound about the spool. The separation material for use in connection with the present invention may be one of various commercially available metal sheets or polymers that can be supplied in a continuous roll. To that end, the separation material may be pulled along with the CNT sheet 321 onto the spool as sheet is being wound about the spool. It should be noted that the polymer comprising the separation material may be provided in a sheet, liquid, or any other form, so long as it can be applied to one side of CNT sheet 321. Moreover, since the intermingled nanotubes within the CNT sheet 321 may contain catalytic nanoparticles of a ferromagnetic material, such as Fe, Co, Ni, etc., the separation material, in one embodiment, may be a non-magnetic material, e.g., conducting or otherwise, so as to prevent the CNT sheet from sticking strongly to the separation material. In an alternate embodiment, a separation material may not be necessary.

After the CNT sheet 321 is generated, it may be left as a CNT sheet or it may be cut into smaller segments, such as strips. In an embodiment, a laser may be used to cut the CNT sheet 321 into strips as the belt 320 or drum rotates and/or simultaneously translates. The laser beam may, in an embodiment, be situated adjacent the housing 32 such that the laser may be directed at the CNT sheet 321 as it exits the housing 32. A computer or program may be employed to control the operation of the laser beam and also the cutting of the strip. In an alternative embodiment, any mechanical means or other means known in the art may be used to cut the CNT sheet 321 into strips.

Figure 4:
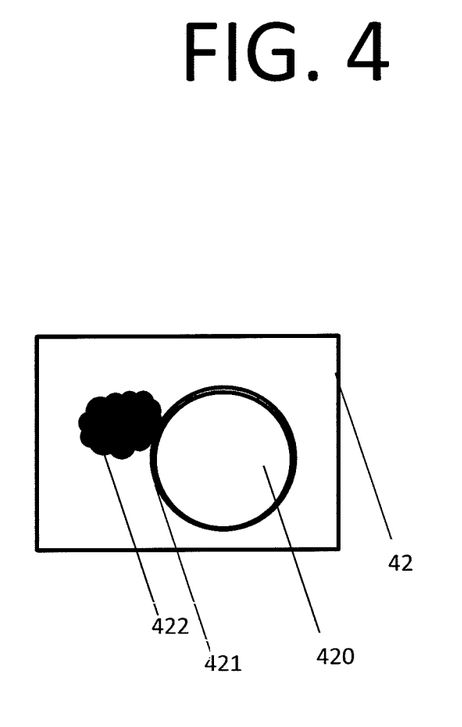
FIG. 4 illustrates a housing of the present invention for harvesting of nanotubes, in accordance with one embodiment.

Alternatively, in another embodiment, instead of a belt, a rigid cylinder such as drum 420 shown in FIG. 4 can be positioned to rotate about an axis, whereby multiple substantially distinct layers of CNT from a cloud of CNT 422 can be deposited on drum 420 to form a sheet 421.

Figure 5:
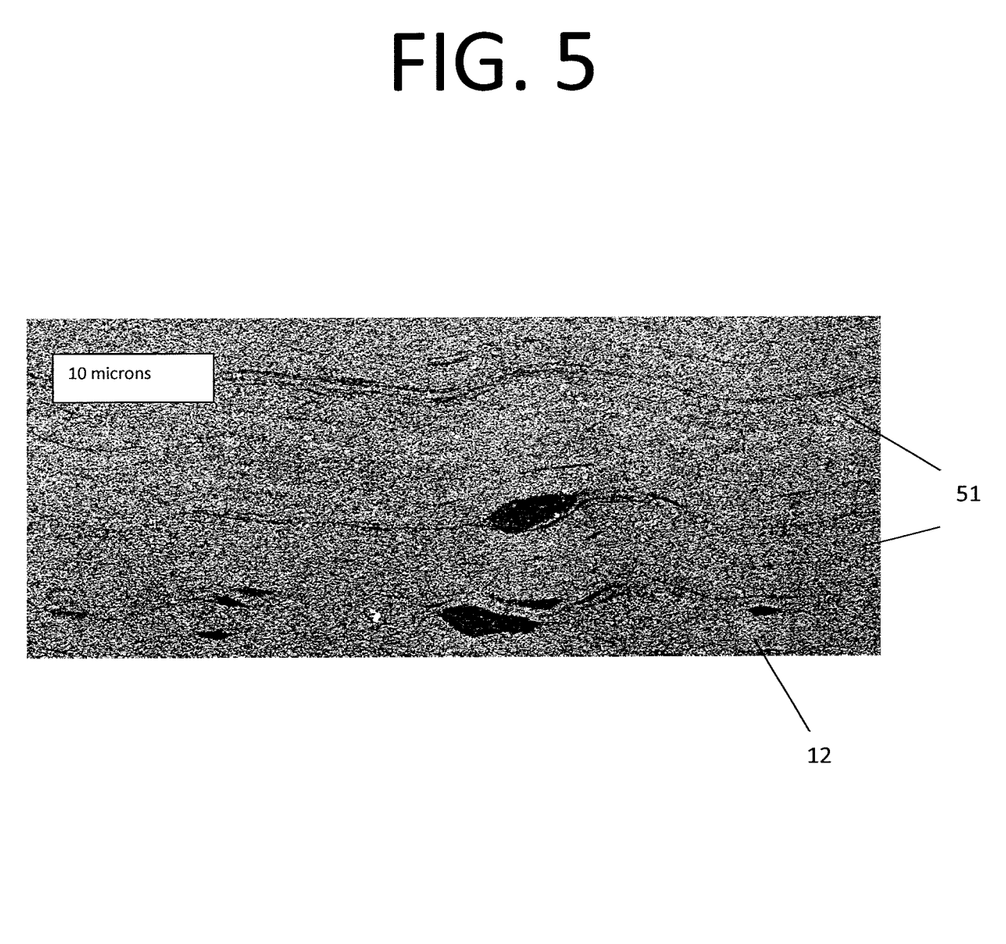
FIG. 5 illustrates a cross section of a nanotube-based material made in accordance with one embodiment of the present invention.

A system suitable for use in accordance with the present invention is shown in FIGS. 3 and 4. The CNT material produced by such system can be collected as a non-woven sheet on a moving belt 320, as shown in FIG. 3, or a drum, as shown in FIG. 4, or can be collected as a yarn on a spindle. Such production method can provide, in a CNT sheet or yarn which can be subsequently used in various applications. The carbon nanotubes 14, in an embodiment, can be deposited in multiple distinct layers 51 to form a multilayered structure or morphology in a single CNT sheet 12, as shown in FIG. 5. In some embodiments, the CNT sheet can have a low normal-to-plane or through-thickness thermal conductivity, which may result from inter-layer and/or inter-tube resistance.

A system similar to system 30 may also be used for manufacturing nanotube yarns. To manufacture yarns, housing 32 can be replaced with an apparatus to receive nanotubes from the furnace 316 and spin them into yarns. The apparatus may include a rotating spindle that may collect nanotubes as they exit tube 315. The rotating spindle may include an intake end into which a plurality of tubes may enter and be spun into a yarn. The direction of spin may be substantially transverse to the direction of movement of the nanotubes through tube 315. Rotating spindle may also include a pathway along which the yarn may be guided toward an outlet end of the spindle. The yarn may then be collected on a spool.

Treatment to Increase Electrical Conductivity

Carbon nanotubes are known to have electrical conductivity many times greater than copper. For example, conductivity of about $300 \times 10^6$ Siemens per meter has been reported for individual nanotubes, whereas the conductivity for copper is about $59 \times 10^6$ Siemens per meter. Carbon nanotubes also exhibit ballistic electrical conduction due, at least in part, to reduced scattering through the nanotube. However, macro-sized nanotube materials, such as nanotube based yarns or sheets, exhibit lower conductivity than individual nanotubes. For example, some nanotube based yarns have conductivity of about $1 \times 10^6$ to $2 \times 10^6$ Siemens per meter. One reason for the lower conductivity is the electrical resistance at the junctions between individual nanotubes within the sheet or yarn. Another reason may be the alignment of carbon nanotubes to one another is the ensemble of carbon nanotubes. Without wishing to be bound by theory, an improved alignment among carbon nanotubes in a direction of conduction may compliment the various treatments, in accordance with the present invention, to increase electrical conductivity at the junctions between individual carbon nanotubes.

In an embodiment, to increase electrical conductivity of the nanotube material (i.e. nanotube sheets, yarns, fibers, etc) of the present invention, the material may be treated to decrease electrical resistance between junctions of individual, adjacent nanotubes within the material. The junctions may represent areas where individual nanotubes come in contact with each other or are positioned near each other. These junctions can often have a higher electrical resistance than the nanotubes themselves. In some instances, it has been noted that the resistance at these junctions is estimated to be about 34 k$\Omega$ or more.

In an embodiment, the material of the present invention can be treated so that a conductive species is adsorbed at these junctions to reduce the resistance between the individual nanotubes. Reducing the resistance between nanotubes can act to increase the overall conductivity of the macro sheet or yarn. One skilled in the art will recognize that, although sheets and yarns are used an example, any nanotube based material, item, or structure made from the process of the present invention can be treated, as disclosed herein, to reduce electrical resistance between junctions of individual nanotubes within the material, item, or structure.

In an embodiment, the nanotube material can be treated by a dilute solution of nickel chloride (e.g. $NiCl_2$ or $NiCl_2$-$6H_2O$) in water. The amount, i.e. concentration, of nickel chloride, the amount of water, and the ratio between the nickel chloride and the water can be determined by the amount of CNT material to be treated, the amount of nanotubes in the material, the inter-nanotube gaps within the material, or any other factor. The sheet or yarn, in one embodiment, can be a permeable material that can be soaked in the nickel-chloride solution, sprayed with the solution, or otherwise exposed to the solution so that the solution infiltrates the material. In an embodiment, as the sheet or yarn is exposed to the solution, the solution can permeate the spaces between nanotubes, including spaces at or near junctions between nanotubes, so that the nickel chloride is sufficiently dispersed throughout the spaces between the nanotubes in the material.

Once the solution has sufficiently infiltrated the nanotube material, the water can be evaporated. In an embodiment, the infiltrated sheet or yarn can be exposed to a relatively dry or hot environment so that the material can dry and the water can evaporate over time. In some instances, the nanotube material can be heated in order to speed the evaporation process. In an embodiment, the nanotube material can be heated to a range of temperatures so as to sufficiently evaporate the water while not compromising the deposition of the nickel chloride. Also, in an embodiment, the temperature may be adjusted according to a predetermined duration for evaporation. As the water evaporates, the nickel chloride salt may remain behind, and remain dispersed throughout the spaces between nanotubes within the CNT material. As the nickel chloride remains within the material, the nickel chloride may tend to absorb or collect at the junctions between nanotubes within the material. Without wishing to be bound by theory, it is believed that the nickel chloride collects at the junctions because the highest energy state occurs at these junctions.

The CNT material can then be exposed to hot hydrogen gas in order to reduce the nickel chloride salt. In an embodiment, the hydrogen gas can be heated to a temperature of about 750 degrees Celsius. The material can be placed into an environment that includes the heated hydrogen gas. In an embodiment, the gas can flow across and/or through the substantially porous CNT material so that the gas can also infiltrate the spaces between individual nanotubes. As the heated hydrogen comes in contact with the nickel chloride, the hydrogen may react with the chlorine anions to form gaseous hydrochloric acid. The hydrochloric acid can then be displaced away from the material, leaving the nickel behind in the form of nickel deposits located at the junctions between nanotubes. These deposits can weld or join the nanotubes together at these junctions between the nanotubes to reduce electrical resistance. For example, since nickel is an electrical conductor, the nickel deposits can reduce the electrical resistance at these junctions to increase the overall conductivity of the nanotube material. It should be appreciated that the deposit can weld or join nanotubes of any size or diameter, including single-walled, double-walled, multi-wall, or bundles of nanotubes, for example.

Although nickel chloride is used in the example above, any appropriate transition metal salt having an anion that can be removed by hydrogen gas, or by another suitable chemical reaction, can be used. Examples of such salts include nickel bromide, nickel fluoride, platinum chloride, palladium chloride, iron chloride, cobalt chloride, or any other suitable salt. In other embodiments, any salt of transition metals can be used, including, for example, those of nickel, gold, palladium, copper, platinum, cobalt, and molybdenum, of any oxidation state or anion (e.g. halide, nitrate, sulfate, perchlorate, acetate, oxalate, etc.) or combinations thereof. When another transition metal salt is used, the hydrogen gas can be heated to a temperature range appropriate for reacting with the salt to form gaseous hydrochloric acid, so as to be removed by venting or any other means. In other embodiments, another reducing agent can be used for reacting with the salt and can be removed thereafter.

In another embodiment, a graphene based carbon (e.g. glassy carbon) can be deposited at the junctions between nanotubes to reduce electrical resistance between individual nanotubes. In order to deposit glassy carbon at the junctions, the nanotube material can be treated with a glassy carbon precursor. In one embodiment, a sheet or yarn of non-woven carbon nanotubes or nanofibers may be immersed in a bath of glassy carbon precursor, or coated with an appropriate glassy carbon precursor, such as malic acid catalyzed furfuryl alcohol or RESOL™ resin (i.e. alkaline catalyst phenol formaldehyde). As the material is treated, the precursor can infiltrate the voids between the overlapping carbon nanotubes. The amount of precursor used may be determined in accordance with the amount of carbon nanotubes in the treated material. The nanotube material and precursor may then be heated and the precursor be allowed to evaporate and polymerize with the nanotubes at a temperature ranging from about 50 degrees C. to about 150 degrees C. To the extent that the resin material may be available in a polymerized form, exposure to heat for polymerization may not be necessary. The non-woven carbon nanotube material may then be exposed to heat ranging from about 125 degrees C. to about 450 degrees C., and at a pressure of at least about 3000 psi for approximately 10 minutes or until the material is treated. It should be appreciated that the temperature, pressure and length of time can be dependent of the type of precursor selected.

Alternatively, a thin sheet 20 of a polymeric resin, such as RESOL resin, polyamide, epoxy, Krayton, polyethylene, or PEEK (polyaryletherketone) resin, other commercially available resin, or a combination thereof, may be positioned on the non-woven sheet or yarn of carbon nanotubes. The CNT material and resin may then be hot pressed at a temperature range of from about 125 degrees C. to about 350 degrees C., and at a pressure of at least about 3000 psi for approximately 10 minutes or until the resin has infiltrated the voids between overlapping nanotubes. By pressing in such a manner, the sheets of polymeric resin may soften and flow to infiltrate voids between overlapping carbon nanotubes. Again, the temperature, pressure and length of time can be dependent of the type of resin selected.

In either case, the CNT material infiltrated with carbon precursor may then be subject to pyrolysis for curing. In particular, the material may be subject to slowly increasing temperature, for instance, less than 1 degree C. per minute. In an embodiment, the curing temperature may be raised to at least between about 1000 degrees C. and about 2000 degrees C., and more preferably about 1700 degrees C. This allows water to evaporate and escape from the glassy carbon precursor, leaving glassy carbon deposits at the junctions between the nanotubes. Without wishing to be bound by theory, it is believed that the glass carbon deposits occur at the junctions between nanotubes because the highest energy state, which is reduced by wetting at the junctions, occurs at the junctions. Similarly to the nickel deposits, the glassy carbon deposits can weld or join the carbon nanotubes at the junctions, so as to reduce electrical resistance between the nanotubes and increase overall conductivity of the CNT material. If the material has been infiltrated with a carbon-containing species, a similar pyrolysis process can be used to heat the material in the absence of oxygen, so that a glassy carbon precursor is produced at the junctions.

Figure 6:
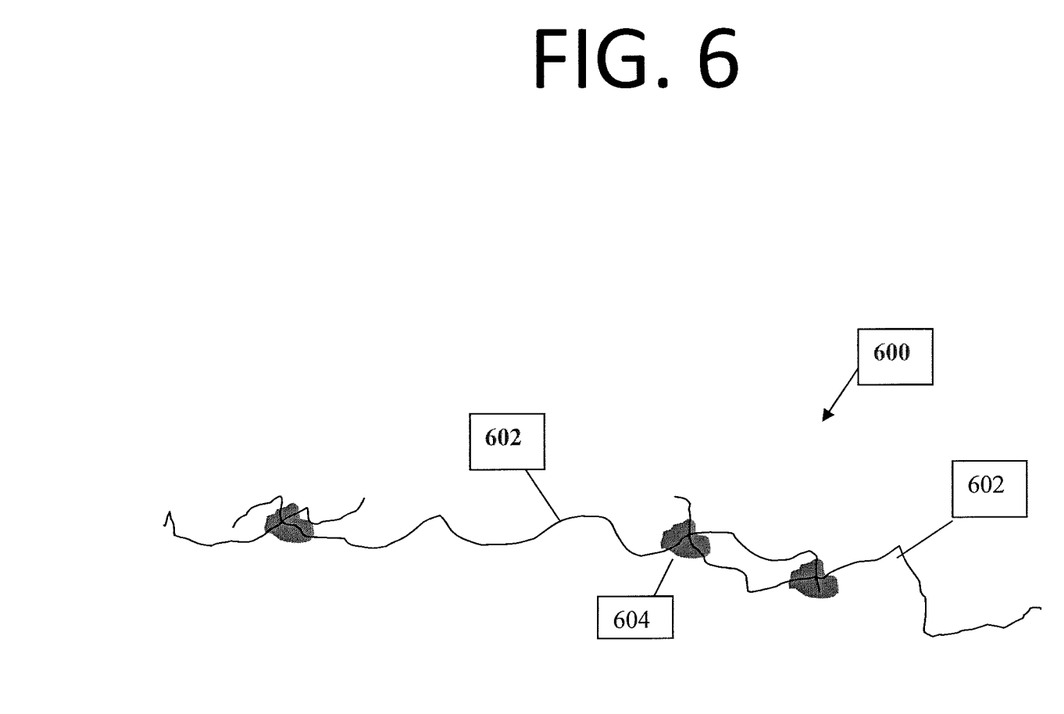
FIG. 6 illustrates carbon nanotubes, within a carbon nanotube based material, having deposits at the junctions between nanotubes.

FIG. 6 shows an example of a CNT material 600 that has been treated to reduce electrical resistance between nanotubes. As shown, voids may exist between nanotubes 602. Once treated, as described above, deposits 604 may weld or join the nanotubes 602 together at the junctions between the nanotubes. These deposits 604 can increase electrical conductivity between individual nanotubes 602 within material 600, so as to increase the overall conductivity of material 600. It should be appreciated that the deposits 604 can include any type of appropriate material including foreign or non-carbon atoms, carbon molecules, carbides, Bucky balls, nanoscale metallic particles, conductive polymers, etc., so long as the deposit material can reduce resistance at the junction between nanotubes.

Once treated to increase conductivity, the CNT material can be cut, trimmed, or shaped for use as an electrical conductor. Multiple sheets can be layered together, and yarns can be bundled or twisted together in order to increase the conductive mass of the conductor. Typical applications for such a sheet or yarn can include use as an electrical wire, a power delivery wire, an electromagnetic shield, a power plane or rail, a ground plane or rail, or any other suitable electrical or electronic application.

According to another aspect of the present invention, a method of enhancing electrical conduction in nano-structured material is provided. In particular, the method includes forming a planar conductor from a cloud of individual carbon nanotubes and depositing in the conductor a substance that can infiltrate spaces between individual nanotubes. Further, the substance is reduced to allow the reduced substance to form conductive deposits at junctions between the nanotubes, so as to reduce electrical resistance between the individual nanotubes at the junctions. Finally, electrical energy can be conducted through the conductor whereby the conductive deposits transmit electrical energy across junctions between individual nanotubes.

Deposition Process Enhancements

According to another aspect of the present invention, in some embodiments, additional processing can be made before and/or after a conductive material is deposited at the junctions between nanotubes to weld, or join, or otherwise conductively connect the nanotubes together and decrease electrical resistance between the nanotubes, in order to enhance the effects of the deposited material. In particular, conductive connections between individual carbon nanotubes can be formed with physical connections or bridges using deposited material, or can be formed with chemical bonds or inter-molecular forces using deposited material, or can be formed with a combination thereof. In other embodiments, the nanotubes can be exfoliated or swelled before a conductive material is deposited, and the nanotubes can be mechanically or otherwise compressed after the conductive material is deposited to further enhance the conductive effects of the deposited material. Further in other embodiment, the nanotubes can be exposed to a co-solvent to reduce the surface tension of aqueous solvents used while the conductive material is deposited in and among the carbon nanotubes, in order to enhance the mass transport of the conductive material or chemical agents into the carbon nanotube material.

In one embodiment, a CNT network can be swelled or partially exfoliated with a solvent, such as an alkyl amide (e.g. n-methylpyrollidione) to increase thickness and pore size of a material made from the CNT network, such that subsequent treatment with a solution containing a conductive additive (e.g. aqueous nickel chloride) can result in more rapid and homogeneous infiltration. The swelling agent can be subsequently removed by drying or pressing to reverse swelling and increase density.

In another embodiment, the medium which contains the conductive additive (e.g. aqueous solution) can be modified by the addition of co-solvents (e.g. ethanol) or surfactants to enhance transport of the conductive material into the nanotube network to be deposited thereon. This can be achieved by a reduction of surface tension and enhancement of wettability of the CNT material of the present invention.

In another embodiment, the CNT material of the present invention may be infiltrated with a conductive cross-linking agent that can chemically and or/physically adhere to the CNT materials. Examples of cross-linking agents include divinyl benzene (trade name LUPEROX®); 1,5 hexane diene, trialyllylcyanurea and other organic molecules with a high degree of pi-bonding and reactive groups. The conjugated molecule can be activated with an initiator and in turn can form a bond with and between carbon nanotubes, for example, by dissolving 0.01 g of benzoyl peroxide (a free radical initiator) in 10 ml of acetone (a solvent), and adding 0.25 ml of divinyl benzene. The solution can be heated to 70 degrees C. and a 2"×2" 10 g/m2 CNT sheet can be added. The reaction lasts for approximately ten minutes and then the sheet can be removed from the liquid and subsequently washed with five 20 ml volumes of acetone and let dry. The resultant sheet can have a tensile strength of 410 MPa compared to 180 MPa for an untreated sheet. Additionally, the Delcom resistivity can be enhanced to a value of 0.6 ohms from a value of 1.5 ohms. Thus the organic molecule can enhance both the electric and mechanical properties of the sheet.

In another embodiment, conductive polymers may be used to enhance CNT properties. In particular, a monomer can be added and incorporated in the CNT material. Aromatic monomers that form conductive polymers can be used, since they can associate well with the aromatic carbons of the CNTs. Examples of resulting conductive polymers include, but are not limited to, polyaniline, polypyrrole, polyisothiphenes, polyethoxydioxythiophene, polyp-phenylene vinylene, polyacetylene, and polyaniline. This is similar to that of a conductive cross-linking agent, where pi-rich molecules, e.g., the monomer or polymer, can react with itself, and also can chemically and/or physically bonds in the junctions between carbon nanotubes. The conductive polymers can also be enhanced by doping or addition of ions or other species.

Post-Production Treatments

Once a CNT sheet is generated, the CNT material may undergo various treatments to modify its properties. Suitable modifications include, but are not limited to in-plane alignment of CNTs, polymer infiltration, hydrogen evolution, metal composite, or any combination thereof. These modifications can provide at least one of an enhanced in-plane alignment, a reduction in between-plane or inter-tube contacts, and enhanced electrical conduction, and can often provide a combination thereof.

In one embodiment, to the extent desired, orientation of the nanotubes in the CNT material can be modified to be substantially aligned along the length of the CNT material. For example, mechanical stretching of the CNT sheet, strip, yarn, or textile-like felt material can align the carbon nanotubes in the plane of the CNT sheet, to facilitate conduction.

The CNT material of the present invention, in an embodiment, can also be infused with polymers. For example, an appropriately chosen polymer can permeate within the spaces between individual nanotubes. Examples of a polymer that can be used include a small molecule or polymer matrix (thermoset or thermoplastic) including, but not limited to, polyurethane, polyethylene, poly(styrene butadiene), polychloroprene, poly(vinyl alcohol), poly(vinyl pyrrolidone), poly(acrylonitrile-co-butadiene-co-styrene), epoxy, polyureasilazane, bismaleimide, polyamide, polyimide, polycarbonate, or any monomer including styrene, divinyl benzene, methyl acrylate, and tert-butyl acrylate. The polymer can be supplied, in one embodiment, in a liquid form (e.g., in a solvent). In another embodiment, the polymer may include polymer particles that may be difficult to obtain in liquid form. This infusion of polymers, in one embodiment, can reduce the contacts between carbon nanotubes situated in adjacent planes, thereby providing further thermal insulation in a direction transverse to the CNT material. In another embodiment, a thermal-insulating and electrical-conducting polymer may be infused so that both thermal insulation and electrical conduction can be enhanced.

In a further embodiment, compositing the CNT material with small amounts of metal may also further enhance conductivity of the sheet. In an embodiment, the metal may be aluminum, nickel, gold, titanium or the like. Metal composite can be made from a salt (any transition metal, alkali metal, or alkali earth metal salt or mixture thereof including, but not limited to, nickel hydroxide, cadmium hydroxide, nickel chloride, copper chloride, calcium zincate ($CaZn_2(OH)_6$)), or metal oxide (any transition metal, alkali metal, or alkali earth metal oxide or mixture thereof, including but not limited to: zinc oxide, iron oxide, silver oxide, copper oxide, manganese oxide, $LiCoO_2$, $LiNiO_2$, $LiN_{i_x}Co_{1-x}O_2$, $LiMn_2O_4$).

For example, aluminum or its alloys can be used to create a foam structure on a surface of the CNT sheet and/or among the nanotubes within the sheet. The foam structure, in an embodiment, can be combined with other methods for creating voids or separations (such as polymer infiltration and/or hydrogen evolution). In an embodiment, the metal may include polymers or volatile solvents to create a carbon nanotube metal matrix. Examples of such metal include powdered forms of aluminum or its alloys, nickel, superalloys, copper, silver, tin, cobalt, iron, iron alloys, or any element that can be produced in a powdered form including complex binary and ternary alloys or even superconductors.

The solution, particles or powder noted above, in an embodiment, may be sprayed on the CNT material as it exits the furnace and is collected on the belt, drum, or spindle. Other methods for deposition can also be used, for instance, the CNT material can be dipped into a bath or reservoir of solution, particles or powder. The spray, in one embodiment, may contain other compounds that cover the outer surface of the nanotubes in such a manner as to enhance alignment of the carbon nanotubes and reduce the inter-tube contacts.

In an embodiment, the spray may include a solvent, a polymer, a metal, or a combination thereof. The solvent used in connection with the solution of the present invention can be used to lubricate the CNT material in order to gain better alignment and enhancement in the properties of the carbon nanotubes. Examples of a solvent that can be used in connection with the solution include toluene, kerosene, benzene, hexanes, any alcohol including but not limited to ethanol, methanol, butanol, isopropanol, as well as tetrahydrofuran, 1-methyl-2-pyrrolidinone, dimethyl formamide, methylene chloride, acetone or any other solvent as the present invention is not intended to be limited in this manner. In an embodiment, the solvent may be used as a carrier for a polymer, monomer, inorganic salt, or metal oxide to.

Once the CNT material has been treated, the treated material may be subject to a heat source for processing. For example, the material may be subject to sintering, hot isostatic pressing, hot pressing, cold isostatic pressing so as to yield the desired form of the final product.

Applications

Sheets, yarns, and fibers of carbon nanotubes made from the present invention can have a wide variety of applications, including as an electrical conductor. CNT material produced in accordance with various embodiments of the present invention can be used as a wire, an electromagnetic shield, a power delivery cable, etc. In an embodiment, a CNT sheet of the present invention can be rolled to form the conductor or shield of a coaxial cable, for example. Additionally, CNT sheets can be layered in order to increase the conductive mass of the sheet to allow the sheet to carry more current. Similarly, CNT yarns can be used to form cable elements, such as conductive elements of coaxial cables, twisted pair cables, etc. The CNT yarns can be twisted or bundled into a larger yarn to increase the amount of conductive mass in the yarn and allow the yarn to carry more current. CNT material of the present invention can also be used to make electrical connections on circuit boards, such as printed circuit boards (PCB), etc.

Examples of specific applications of the CNT material of the present invention can also include electromagnetic interference shielding (EMI shielding) which may reflect or absorb EMI radiation and thereby provide electrical shielding. Shielding may be beneficial to prevent interference from surrounding equipment and may be found in stereo systems, telephones, mobile phones, televisions, medical devices, computers, and many other appliances. Shielding may also be beneficial to reduce electromagnetic emissions that radiate from electronic devices. Reducing such radiated emissions can help the electronic device meet regulatory EMC requirements. The conductive layer may also be used as a ground plane or power plane, and may provide a means of creating an electromagnetic mirror.

While the present invention has been described with reference to certain embodiments thereof, it should be understood by those skilled in the art that various changes may be made and equivalents may be substituted without departing from the true spirit and scope of the invention. In addition, many modifications may be made to adapt to a particular situation, indication, material and composition of matter, process step or steps, without departing from the spirit and scope of the present invention. All such modifications are intended to be within the scope of the claims appended hereto.

What is claimed is:

1. A nanostructured material comprising:
    a conductive body defined by a plurality of non-aligned;
    a dispersant comprising (i) a plurality of conductive metal element deposits and (ii) at least one of glassy carbon, carbide, carbon 13, irradiated carbon nanotube materials, bucky balls, and a crosslinking agent selected from divinyl benzene, 1,5-hexane diene, and/or other organic molecules with a high degree of pi-bonding, wherein such dispersants are dispersed within the conductive body; and
    a plurality of conductive connections formed by the dispersants at junctions between non-aligned nanotubes.

2. A nanostructured material as set forth in claim 1, wherein the connections are selected from physical connections, bridges, chemical bonds, inter-molecular forces, or a combination thereof.

3. A nanostructured material as set forth in claim 1, wherein the plurality of conductive metal element deposits are selected from nickel, gold, palladium, copper, platinum, cobalt, and molybdenum deposits.

4. A nanostructured material as set forth in claim 1, wherein the conductive body is a non-woven sheet.

5. A sheet comprising:
    a non-woven sheet defined by a plurality of non-aligned adjacent double wall and/or multiwall nanotubes, the non-woven sheet having a plurality of layers;
    a dispersant comprising (i) a plurality of conductive metal element deposits and (ii) at least one of glassy carbon, carbide, carbon 13, irradiated carbon nanotube materials, bucky balls, and a crosslinking agent selected from divinyl benzene, 1,5-hexane diene, and/or other organic molecules with a high degree of pi-bonding, wherein such dispersants are dispersed within the non-woven sheet; and
    a plurality of conductive connections formed by the dispersants at junctions between non-aligned nanotubes,
    wherein the sheet has a strength of greater than 400 MPa.

6. A nanostructured material comprising:
    a conductive body defined by a plurality of nanotubes, the conductive body having a plurality of layers;
    a dispersant comprising (i) a plurality of conductive metal element deposits and (ii) at least one of glassy carbon, carbide, carbon 13, irradiated carbon nanotube materials, bucky balls, and a crosslinking agent selected from divinyl benzene, 1,5-hexane diene, and/or other organic molecules with a high degree of pi-bonding, wherein such dispersants are dispersed within the conductive body;
    a plurality of conductive connections formed by the dispersant at junctions between non- aligned nanotubes,
    wherein the plurality of connections formed by the plurality of conductive metal element deposits are obtained by treating the body with a transition metal salt solution to infiltrate spaces between individual nanotubes and reducing the transition metal salt by exposing the body to heated hydrogen gas to allow the reduced transition metal salt to form the conductive metal element deposits at junctions between the individual nanotubes, so as to reduce electrical resistance between the individual nanotubes at the junctions.

7. A material as set forth in claim 6, wherein the transition metal salt solution is a nickel chloride solution and wherein the heated hydrogen gas reduces the nickel chloride to metallic nickel deposits.

8. A material as set forth in claim 6, wherein water is allowed to evaporate from the transition metal salt solution before reducing the transition metal salt.

9. A material as set forth in claim 6, further comprising exposing the body to a solvent so as to increase the thickness and pore size of the body, before the step of treating the body with the transition metal salt solution.

* * * * *